United States Patent

[11] 3,600,815

| [72] | Inventor | Helmut Link<br>Esslingen-lerchenaecker, Germany |
|---|---|---|
| [21] | Appl. No. | 759,397 |
| [22] | Filed | Sept. 12, 1968 |
| [45] | Patented | Aug. 24, 1971 |
| [73] | Assignee | Index-Werke K. G. Hahn & Tessky,<br>Esslingen (Neckar), Germany |
| [32] | Priority | Sept. 15, 1967 |
| [33] | | Germany |
| [31] | | P 16 02 840.3 |

[54] SETTING ARRANGEMENT FOR FACILITATING THE POSITIONING OF CROSS-SLIDES IN MACHINE TOOLS FOR TREATMENT OF ROUND WORKPIECES
10 Claims, 18 Drawing Figs.

[52] U.S. Cl. ............................................. 33/185,
33/181, 82/34
[51] Int. Cl. ................................................ B27g 23/00
[50] Field of Search ......................................... 82/34;
33/181, 185, 169 CF, 172 CF

[56] References Cited
UNITED STATES PATENTS

| 1,283,868 | 11/1918 | Nefedov | 33/185 X |
| 3,292,267 | 12/1966 | Wilterdink et al. | 33/185 |
| 3,333,493 | 8/1967 | Bullard et al. | 82/36 |
| 3,358,375 | 12/1967 | Lutz | 82/34 X |

FOREIGN PATENTS

| 930,335 | 1/1948 | France | 33/185 |
| 948,266 | 1/1964 | Great Britain | 33/185 |

*Primary Examiner*—Leonidas Vlachos
*Attorney*—Michael S. Striker

ABSTRACT: The cross-slide of a turning lathe wherein round workpieces are treated by tools mounted in toolholders movable in the cross-slide radially of the work spindle is pivotable in a plane extending at right angles to the work spindle about an axis which is parallel to the axis of the work spindle. The cross-slide is further movable in parallelism with the axis of the work spindle. The apparatus for properly positioning the cross-slide with reference to a round workpiece in the work spindle comprises a first positioning device including caliper which can facilitate adjustment of the cross-slide in a sense to place the cutting edge of a tool in the toolholder of the cross-slide on the axis of the workpiece, and a second positioning device which facilitates movement of the cross-slide to a position in which the cutting edge of the tool in the toolholder on the cross-slide is located at a desired distance from the front end face of the workpiece in the work spindle.

Inventor:
HELMUT LINK

By: Michael S. Striker
Attorney

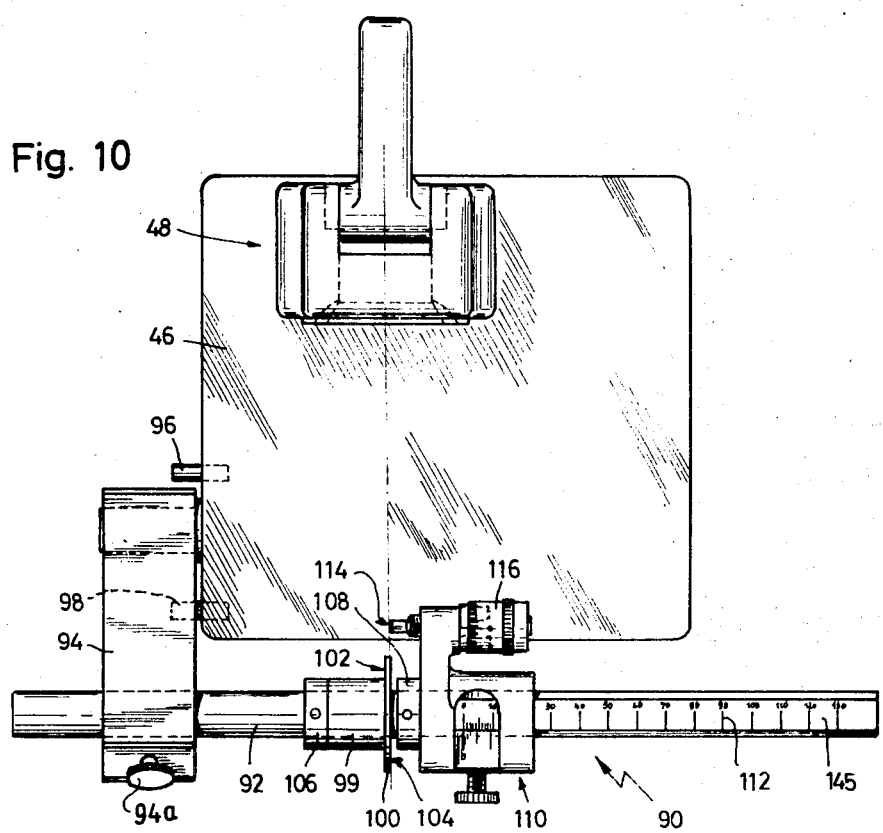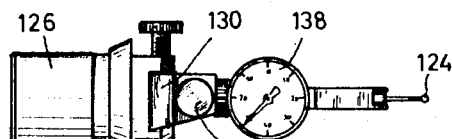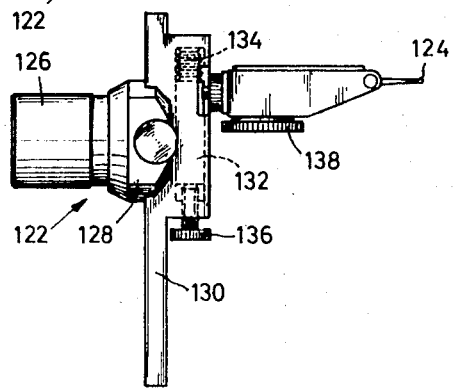

Inventor:
HELMUT LINK

SETTING ARRANGEMENT FOR FACILITATING THE POSITIONING OF CROSS-SLIDES IN MACHINE TOOLS FOR TREATMENT OF ROUND WORKPIECES

BACKGROUND OF THE INVENTION

The present invention relates to machine tools in general, and more particularly to improvements in machine tools which are designed for treatment of bars, cylinders and other types of round workpieces and wherein such treatment is carried out by tools which are mounted on one or more cross-slides. Still more particularly, the invention relates to improvements in setting arrangements and devices for facilitating positioning of cross-slides or of toolholders on cross-slides in such a way that tools carried by the toolholders can be rapidly and accurately placed into predetermined positions with reference to the axes and/or end faces of workpieces.

At the present time, proper positioning of tools with reference to round workpieces in rotary work spindles of turning lathes or like machine tools depends exclusively on the skill and carefulness of the operator. To my knowledge, no equipment is available to facilitate such work. The preparation of a satisfactory setup consumes much time and must be carried out by skilled workers.

SUMMARY OF THE INVENTION

One of the objects of my invention is to provide a positioning device or setting arrangement which facilitates the placing of a cross-slide into such position that the cutting edge of a turning or like tool which is mounted on the cross-slide is located in a plane including the axis of a round workpiece in the work spindle of the machine tool so that the cutting edge will be located on the axis when the tool is fed radially toward the work spindle.

Another object of the invention is to provide a positioning device of the just-outlined character which can be permanently or separably mounted on a cross-slide or on a toolholder in such cross-slide.

A further object of the invention is to provide a positioning apparatus which includes the just-outlined positioning device and which can be assembled as a separate entity to be used in connection with one or more machine tools for positioning of cross-slides carrying tools for treatment of workpieces of greater or smaller diameter.

An additional object of the invention is to provide an apparatus which, in addition to the just-mentioned positioning device, can be provided with a second positioning device enabling an operator to locate the tool at a desired distance from the front end face of a round workpiece in the work spindle.

Still another object of the invention is to provide a positioning apparatus which can be used to facilitate proper positioning of cross-slides which are movable in a plane at right angles to the axis of the work spindle in a turning lathe or a like machine tool and which ensures rapid but highly accurate positioning of cross-slides to facilitate the formation of accurately defined and located grooves, shoulders, end faces or the like on round workpieces.

One feature of my invention resides in the provision of a device for facilitating positioning of cross-slides in machine tools for treatment of round workpieces wherein the workpiece is rotatable with a work spindle and wherein the cross-slide is movable with reference to the work spindle in a plane which is normal to the axis of the work spindle and substantially or exactly at right angles to a line located in such plane and extending radially from the work spindle in the general direction of the cross-slide. The positioning device comprises a caliper having a scanning or sensing portion provided with two legs making with each other an angle of less than 180° and being adjustably mounted on a cross-slide so as to permit its adjustment to a position in which the apex of the angle between the legs is located in the plane of the cutting edge on a tool in the toolholder carried by the cross-slide. The cross-slide is thereupon adjusted with reference to the frame of the machine tool so as to place both legs of the caliper's sensing portion into abutment with the peripheral surface of a round workpiece in the work spindle. Such position of the cross-slide corresponds to desired position of the toolholder which latter is thereupon movable radially of the work spindle and can thus move the cutting edge of the tool therein onto the axis of the workpiece in the work spindle.

The just-described caliper can be mounted on the cross-slide, on a toolholder or in a special positioning apparatus which is constructed and assembled in accordance with a second feature of my invention and can comprise a second positioning device adapted to facilitate movement of the cross-slide in parallelism with the axis of the work spindle to a position in which the cutting edge of the tool in a toolholder mounted on the cross-slide is located at a predetermined distance from the front end face of a round workpiece in the work spindle.

The novel features which are considered as characteristic of the invention are set forth in particular in the appended claims.

The improved positioning apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 10 is a top plan view of the apparatus shown in FIG. 5 with the setting device for the positioning device of FIG. 7 removed;

FIG. 11 is an end elevational view of an auxiliary carrier which forms part of the second positioning device in the apparatus of FIGS. 5 and 10;

FIG. 12 is a top plan view of the auxiliary carrier shown in FIG. 11;

DESCRIPTION OF THE PREFERRED EMBODIMENTS

Figure 1:
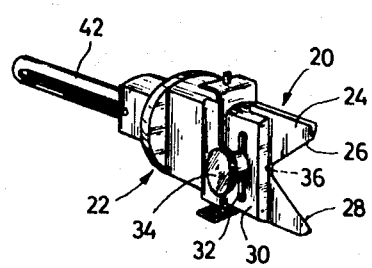
FIG. 1 is a perspective view of a first positioning device which enables an operator to select the position of a cross-slide in a turning lathe or the like in such a way that the cutting edge of a tool whose holder is inserted into the cross-slide (to replace or to support the positioning device) is located in a plane which includes the axis of a round workpiece in the work spindle of the machine tool and that the toolholder can be fed to move the tool into a position in which the latter's cutting edge is located on the axis of such workpiece.
Figure 2:
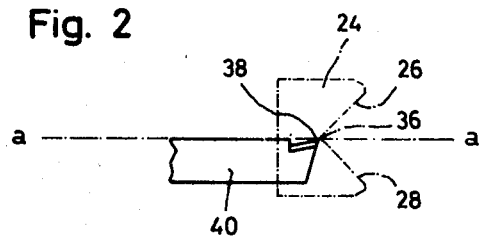
FIG. 2 is a diagrammatic view of a tool and further shows certain parts of the positioning device during adjustment to place the sensing portion of the positioning device into a requisite position with reference to the cutting edge.

Referring first to FIG. 1, there is shown a positioning device including a caliper 20 which facilitates such adjustment of a material-removing tool on a cross-slide or such adjustment of the entire cross-slide that the tip of the tool is located on the axis of the work spindle, i.e., on the axis of a bar, a cylinder or another round workpiece which is held in the chuck of the work spindle. The caliper 20 is adjustably supported by a carrier or head 22 and can be fixed thereto in a selected position of adjustment. The carrier 22, in turn, can be installed in a socket for a toolholder or directly in a cross-slide of a turning lathe or an analogous machine tool for treatment of round workpieces. The caliper 20 includes a scanning or sensing portion 24 which includes two legs 26, 28 making with each other an angle of less than 180° and having an apex 36 which is to coincide with the tip of the tool when the latter is properly mounted in its holder or directly on the cross-slide. A tool 40 is shown in FIG. 2 and its tip is indicated at 38. When the carrier 22 for the caliper 20 is mounted on a cross-slide, the legs 26, 28 of the scanning portion 24 of the caliper are located in a plane which is normal to the axis of the work spindle. The legs 26, 28 may be formed with flat edge faces or with sharp edges.

Referring again to FIG. 1, the scanning portion 24 is adjacent to one side of a check 30 formed with a transverse slot 32 for the stem of a screw 34 which meshes with the scanning portion 24 and can fix it to the cheek. The slot 32 extends in a vertical plane at right angles to the axis of the work spindle and, as stated above, the legs 26, 28 are also located in a plane which is normal to the axis of the work spindle. As will be described in connection with FIGS. 8 and 9, the carrier 22 can be adjusted in a plane which is normal to the axis of the work spindle when such carrier is mounted in a cross-slide. Also, the caliper 20 is adjustable at right angles to the axis of the tool unit the apex 36 of the angle enclosed by legs 26, 28 coincides with the tip 38 of the tool 40, i.e., until the apex 36 is located in the plane a—a of the cutting edge on the tip 38 (see FIG. 2). The sensing portion 24 and the cheek 30 are movable axially of the carrier 22, i.e., radially of the work spindle. To this end, the cheek 30 comprises a shank or stem 42 which extends through an axial bore of the carrier 22. The locking means for fixing the stem 42 to the carrier 22 in selected axial position is shown but not identified in FIG. 1. Proper placing of the apex 36 into the plane a—a of the cutting edge on the tip 38 can be assisted by resorting to a suitable auxiliary positioning member which is separably affixed to the caliper 20 and is designed in such a way that the apex 36 is located in the plane a—a when a surface of the auxiliary positioning member abuts against the tip 38.

Figure 3:
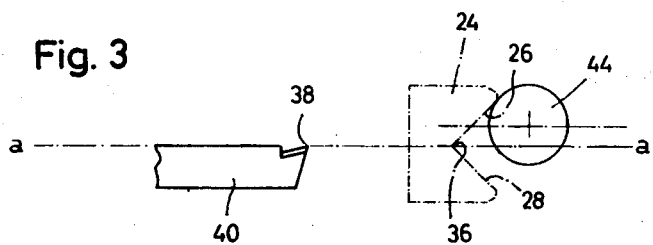
FIG. 3 illustrates schematically the manner in which the scanning portion of the positioning device is moved into engagement with a round workpiece in the work spindle of the machine tool.
Figure 4:
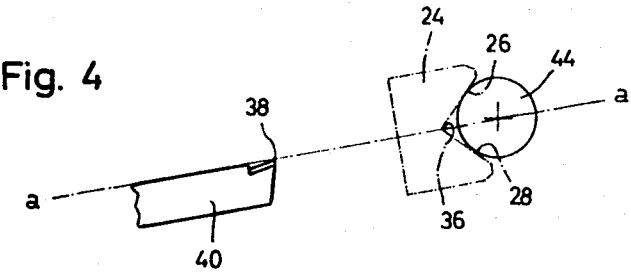
FIG. 4 illustrates the scanning portion of FIGS. 2 and 3 in proper position with reference to the workpiece.

In order to place the tip 38 of the tool 30 onto the axis of the round workpiece which is mounted in the chuck of the work spindle, the operator proceeds as follows: In the first step, the apex 36 of the scanning portion 24 is placed into the plane a—a as shown in FIG. 2. In the next step, the cheek 30 is moved radially of the work spindle until the edge face of one of the legs 26, 28 abuts against the peripheral surface of the round workpiece 44 (FIG. 3) in the chuck of the work spindle. The cross-slide which carries the carrier 22 and caliper 20 is then adjusted until both legs 26, 28 engage the peripheral surface of the workpiece 44 in a manner as shown in FIG. 4. This ensures that the tip 38 of the tool 40 is located on the axis of the workpiece 44 when the carrier 22 is removed from the cross-slide and is replaced by the holder of the tool 40.

The heretofore-described part of the improved positioning apparatus employs a carrier 22 which can be inserted into the cross-slide instead of a toolholder for the tool 40 or adjacent to or on such toolholder.

The cross-slide which can carry the positioning device OF FIG. 1 should be adjustable with reference to the workpiece in a plane which is normal to the axis of the work spindle. The arrangement is preferably such that the cross-slide is adjustable in the just-mentioned plane in directions substantially or exactly at right angles to a line extending radially from the axis of the work spindle and in the general direction of the cross-slide. Such adjustability of the cross-slide renders it possible to move both legs 26, 28 of the sensing portion 24 into abutment with the peripheral surface of the workpiece 44 when the caliper 20 is mounted on the cross-slide.

If the caliper 20 is mounted on the cross-slide adjacent to the holder for the tool 40, and if the apex 36 of the angle between the legs 26, 28 is already located in the plane a—a of the cutting edge on the tip 38 of the tool 40 when the operator begins to adjust the cross-slide for the purpose of moving the legs 26, 28 to the position shown in FIG. 4, the cutting edge on the tip 37 is automatically placed onto the axis of the workpiece 44 when the adjustment of the cross-slide is completed. The caliper 20 can be removed from the cross-slide when the tool 40 actually treats the workpiece.

If the toolholder for the tool 40 is mounted in a cross-slide adjacent to the caliper 20, the position of the sensing portion 24 with reference to the cheek 30 can remain unchanged if the toolholder or the tool therein is adjustable with reference to the cross-slide in such a way that the plane a—a of FIG. 2 can be moved to the position shown in FIG. 2. If the caliper 20 is mounted directly on the toolholder and is adjustable with reference thereto so that the apex 36 can be placed into the plane a—a, the cross-slide is moved with the thus-adjusted caliper until the legs 26, 28 engage the workpiece 44 in a manner as shown in FIG. 4.

In accordance with one of the presently preferred embodiments of my invention, the carrier 22 for the caliper 20 is mounted on the cross-slide adjacent to the toolholder for the tool 40 and is either movable to a position in which it cannot interfere with operation of the tool or is bodily separable from the cross-slide prior to actual engagement between the workpiece and the tool. Alternatively, and as stated above, the carrier 22 can be mounted in or on the toolholder for the tool 40 in such a way that the cheek 30 is movable radially of the work spindle. In each instance, the cross-slide is provided with means for supporting the carrier 22, either in the cross-slide proper or in or on the toolholder.

Figure 5:
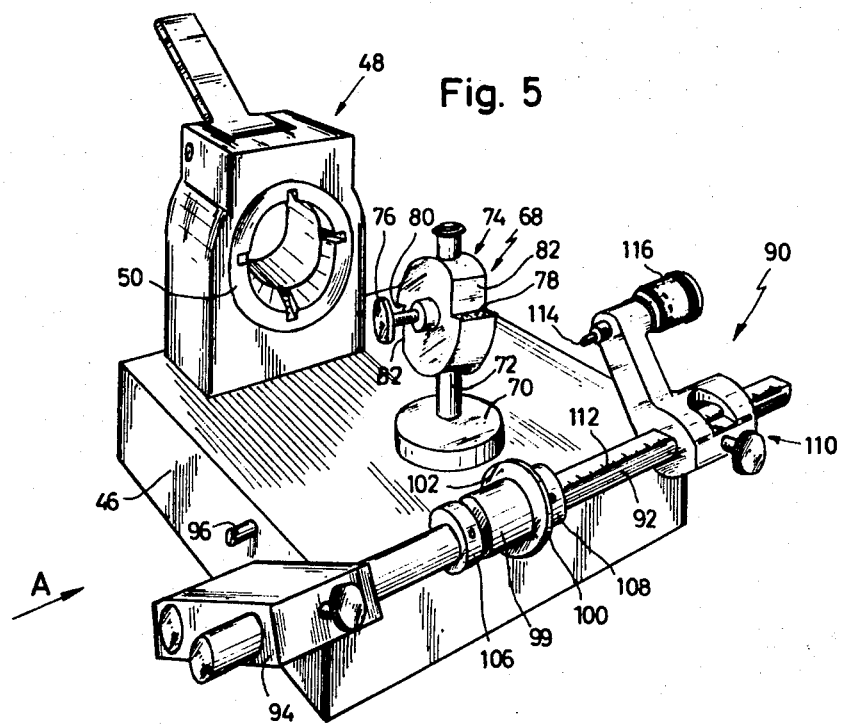
FIG. 5 is a perspective view of a positioning apparatus which can utilize the positioning device of FIG. 1 and further comprises a second positioning device which enables an operator to place the cutting edge of a tool at a requisite distance from the front end face of a round workpiece.
Figure 6:
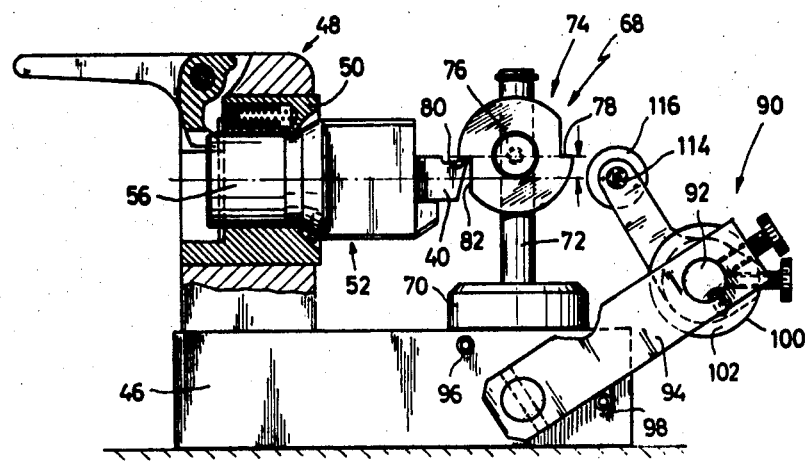
FIG. 6 is a partly elevation (arrow A in FIG. 5) and partly transverse vertical sectional view of the apparatus and shows the latter while it carries a toolholder serving to facilitate adjustment of a setting member which is provided to ensure proper adjustment of the scanning portion in the positioning device of FIG. 1.
Figure 7:
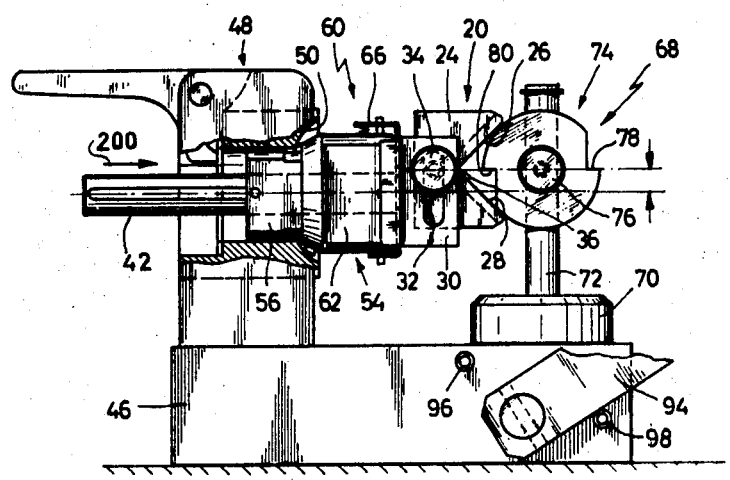
FIG. 7 illustrates the manner of adjusting the scanning portion of the positioning device upon removal of the toolholder shown in FIG. 6.

FIGS. 5 to 7 illustrate certain details of an apparatus which can be used to properly position the cross-slide of a machine tool prior to attachment of the toolholder to such cross-slide. This apparatus comprises a horizontal main supporting member or base 46 which resembles a flat plate and has a horizontal top surface. The base 46 supports a headstock 48 provided with a horizontal socket 50 which can accommodate a toolholder 52 (FIG. 6) or a carrier 54 (FIG. 7) corresponding to the carrier 22 of FIG. 1. The toolholder 50 supports a tool 40 and has a boss 56 which fits into the socket 50. A similar boss 56 is also provided on the carrier 54 of FIG. 7. Furthermore, the bosses 56 of the toolholder 52 and carrier 54 can be fitted into a cross-slide, such as the cross-slide 58 shown in FIGS. 8 and 9. The details of this cross-slide are disclosed and claimed in the copending application Ser. No. 758,738 filed Sept. 10, 1968 by Gerhard Föll et al. for "Machine Tool" and assigned to the same assignee.

In FIG 7, the numeral 60 denotes the aforementioned carrier 54 and the remaining parts of the positioning device corresponding to that shown in FIG. 1. The boss 56 of the carrier 54 has an axial bore for the stem 42 of the cheek 30 for the caliper 20. Such bore further extends through a front portion 62 of the carrier 54 and this front portion 62 is adjacent to the cheek 30. A spring (not shown) biases the cheek 30 in the direction indicated by arrow 200 so that the caliper 20 tends to move in a direction to the right, as viewed in FIG. 7. The numeral 66 denotes a locking device by means of which the cheek 30 can be coupled to the front portion 62 of the carrier 54 in the starting position shown in FIG. 7.

The apparatus further comprises an upright stand 68 having a foot 70 which is supported by and is movable along the top surface of the base 46. The stand 68 further comprises a guide rod or upright 72 for a setting member or pattern 74. The latter resembles a short cylinder having a horizontal axis which is normal to the axis of the upright 72. A screw 76 is provided to fix the setting member 74 to the upright 72 in a selected position of adjustment. The purpose of the setting member 74 is to facilitate placing of the sensing portion 24 of the caliper 20 into the plane of the tip 38 on the tool 40. To this end the setting member 74 comprises two peripheral notches flanked in part by two radially extending shoulders 78, 80 located diametrically opposite each other. Each notch is further flanked by a facet 82 (FIG. 5 or 6) which is normal to the respective shoulder 78 or 80. The facets 82 extend in opposite directions from the common plane of the shoulders 78, 80 so that the shoulder 78 can be used to engage a tool 40 whose cutting edge is located at its underside and that the shoulder 80 can be used to engage a tool 40 (FIG. 6) whose cutting edge 38 is located at its upper side, i.e., the apparatus can be used for positioning of cross-slides in machines wherein the work spindle rotates in a clockwise or in a counterclockwise direction.

The operation of the heretofore-described parts of the apparatus shown in FIGS. 5 to 7 is as follows:

In the first step, the toolholder 52 with the tool 40 is mounted in the socket 50 of the headstock 48 in a manner as shown in FIG 6. In the next step, the setting member 74 is moved with its stand 68 along the top surface of the base 46 until the shoulder 80 abuts against the cutting edge of the tip 38 of the tool 40. Thus, the axis of the setting member 74 is now located in the plane of the cutting edge on the tip 38 of the tool 40. In the next-following step, the toolholder 52 is removed from the socket 50 and is replaced by the carrier 54 of FIG 7. The stand 68 is returned to the position shown in FIG 6 and the sensing portion 24 of the caliper 20 is adjusted with reference to the cheek 30 until its legs 26, 28 abut against the peripheral surface of the setting member 74 in a manner as shown in FIG 7. This places the apex 36 of the angle between the legs 26, 28 into the aforementioned plane of the cutting edge on the tip 38 of the tool 40.

Figure 8:
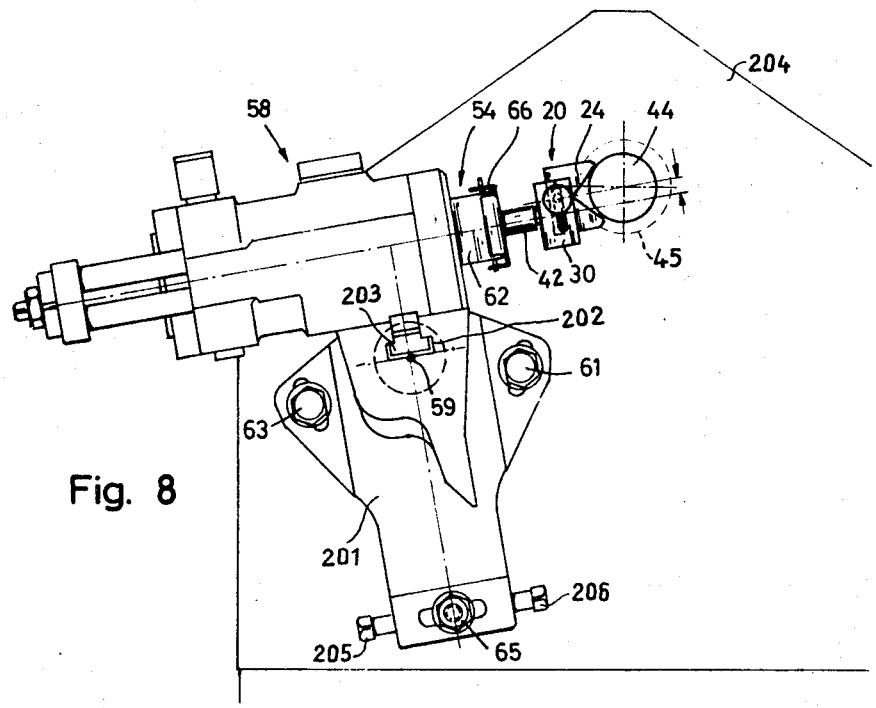
FIG. 8 is a schematic end elevational view of the working station in a machine tool having a cross-slide which is about to be adjusted with reference to the workpiece in a work spindle by resorting to the positioning device of FIG. 7.

The carrier 54 is thereupon removed from the socket 50 and is installed in the cross-slide 58 of FIG. 8. The cross-slide 58 is adjusted until the legs 26, 28 of the sensing portion 24 abut against the peripheral surface of the workpiece 44 in the work spindle 45 of the machine tool which includes the cross-slide 58. The workpiece 44 can constitute a bar which is fed through the bore of the work spindle 45 in a manner well known from the art of single-spindle bar machines. The cross-slide 58 forms part of a cross-slide assembly which further includes a carriage 201 pivotable about the axis of a shaft 59 which is parallel to the axis of the work spindle 45. In addition, the carriage 201 comprises a T-groove 202 which receives a rail 203 of the cross-slide 58 so that the latter can be shifted in parallelism with the work spindle 45. In other words, the cross-slide 58 is pivotable with the carriage 201 about the shaft 59 to move in a plane which is normal to the axis of the work spindle 45, and the cross-slide 58 is further moveable with reference to the carriage 201 along the T-groove 202. Still further, the cross-slide 58 comprises means for moving the carrier 54 radially of the work spindle 45; such moving means preferably comprises a piston movable in a double-acting cylinder of the cross-slide 58 in a manner as fully disclosed in the aforementioned copending application of Föll et al.

The locking device 66 is disengaged when the carrier 54 is inserted into the cross-slide 58 so that the aforementioned spring then urges the caliper 20 in a direction toward the axis of the workpiece 44 in the work spindle 45. This is advisable because the cross-slide 58 then need not be moved radially of the work spindle. When the legs 26, 28 of the caliper 20 engage the peripheral surface of the workpiece 44 in a manner as shown in FIG. 8, the carriage 201 is fixed against pivotal movement on the shaft 59 by means of bolts 61, 63, 65 which are provided on a frame member 204 of the machine tool and whose stems extend through arcuate slots provided therefor on the carriage 201. The latter further carries two precision adjustment screws 205, 206 which cooperate with the stem of the bolt 65 to facilitate accurate selection of the angular position of carrier 201 with reference to the shaft 59.

Figure 9:
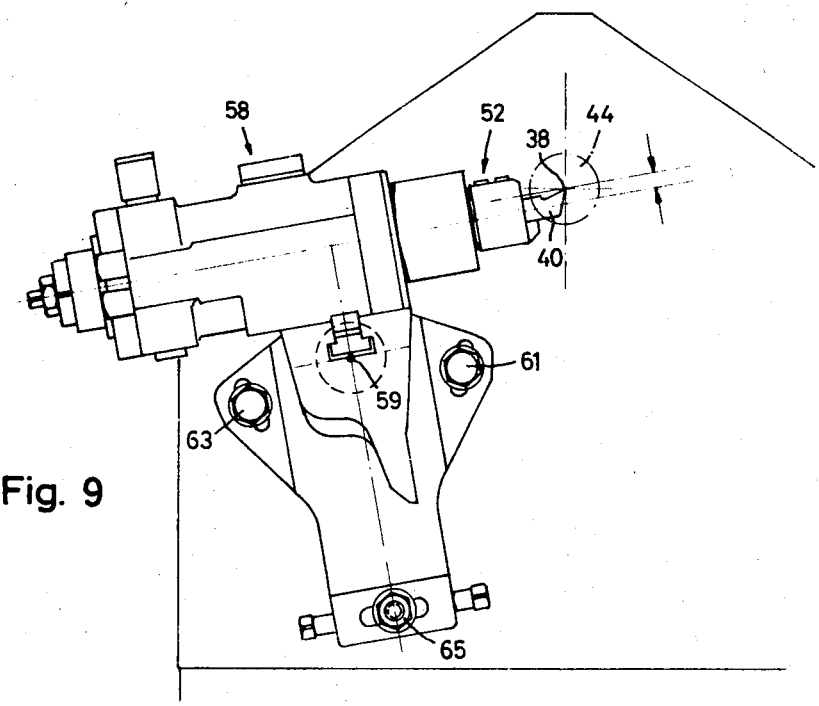
FIG. 9 illustrates the cross-slide in properly adjusted position and with the toolholder of FIG. 6 mounted therein.

In the next step, the carrier 54 is removed from the cross-slide 58 and is replaced by the toolholder 52 of FIG. 6. As shown in FIG. 9, the cutting edge of the tip 38 on the tool 40 in the toolholder 52 is then automatically located on the axis of the workpiece 44. Of course, the toolholder 52 is inserted into the cross-slide 58 when the latter's piston is withdrawn in a direction radially away from the axis of the work spindle 45 so that the workpiece 44 cannot interfere with insertion of the toolholder 52. When the work holder 52 is thereupon fed radially toward the work spindle 45, the cutting edge on the tip 38 removes material from the workpiece 44.

The apparatus of FIGS. 5 to 7 further comprises a second positioning device 90 for facilitating the placing of the tool 40 into a predetermined position with reference to the front end face of the workpiece 44. In this way, the tip 38 can form a groove in the periphery of the workpiece at a predetermined distance from the latter's front end face. In other words, the device 90 enables the operator to move the cross-slide 58 of FIG. 8 or 9 in the axial direction of the work spindle 45 (with reference to the carriage 201) so that the tool 40 in the toolholder 52 will be located in a plane which is normal to the axis of the work spindle and is located at a predetermined distance from the front end face of the workpiece 44.

Figure 13:
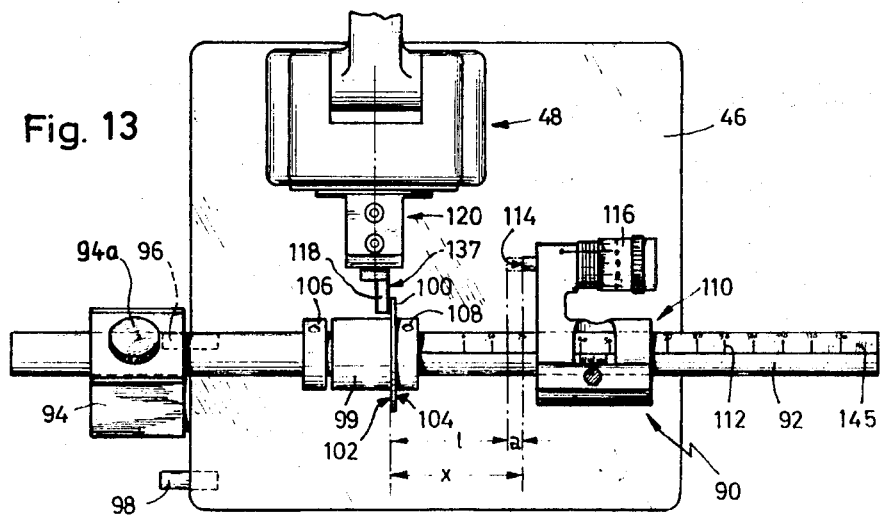
FIG. 13 is a top plan view of the positioning apparatus and illustrates the second positioning device in operative position and a toolholder which is mounted in the headstock of the positioning apparatus.

The device 90 comprises a supporting bar 92 which is parallel to the top surface of the base 46 and whose axis is normal to the axis of the socket 50 in the headstock 48. The bar 92 is movable axially in and is pivotable with a bracket 94 which is pivotably secured to a side face of the base 46 and is movable between two end positions determined by stops 96, 98 carried by the base (see also FIG. 10). The angular position which the bracket 94 assumes when it abuts against the stop 96 is the operative position (FIG. 13). When it abuts against the stop 98, the bracket 94 is held in inoperative position (see FIGS. 6, 7, 10 and 14). The rod 92 carries an abutment 99 which constitutes a sleeve and is movable axially of the bar and comprises a flange 100. The two end surfaces 102, 104 of the flange 100 represent the front end face of the workpiece 44. The sleeve or abutment 99 is shiftable through a predetermined distance between two ring-shaped stops 106, 108. Such distance corresponds to the axial length of the flange 100.

Figure 16:
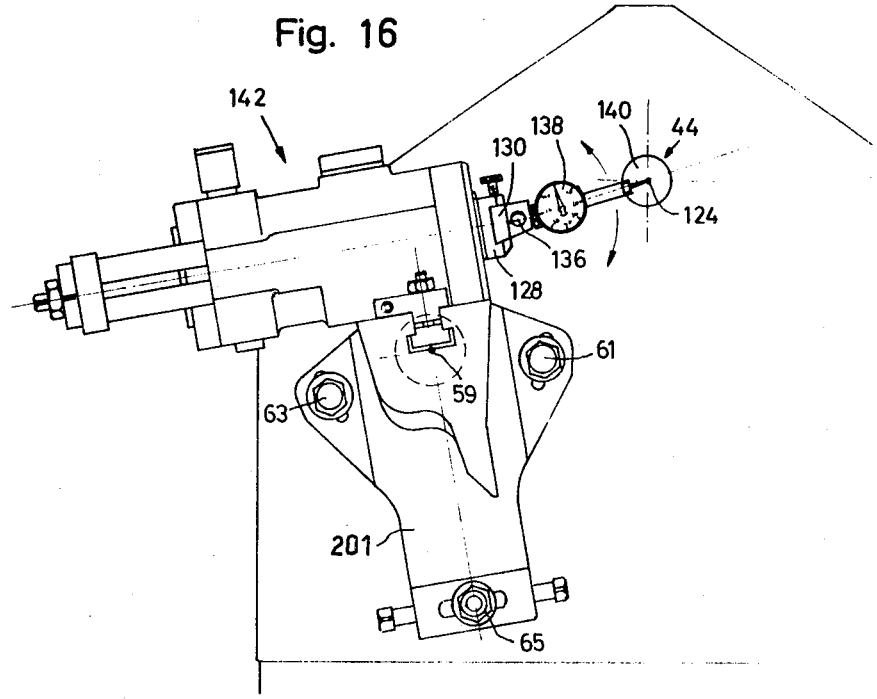
FIG. 16 is a fragmentary end elevational view of a machine tool (arrow B in FIG. 17) and illustrates the cross-slide prior to adjustment and while the cross-slide mounts the auxiliary carrier of FIGS. 11 and 12.

The bar 92 further carries an adjusting device 110 which is movable lengthwise thereof and can assume a predetermined position with reference to a scale 112 on the bar 92. This scale 112 enables the operator to locate the adjusting device 110 at a predetermined distance from the abutment 99, namely at the same distance at which the tip of the tool 118 in the toolholder 120 (FIG. 13) should engage the workpiece 44 from the latter's front end face 140 (FIG. 16). The adjusting device 110 comprises a reference surface 114 provided on a post which can be shifted with reference to the remainder of the device 110 by way of a micrometer screw 116 or by analogous precise adjusting means. In FIG. 13, the holder 120 for the tool 118 is installed in the socket of the headstock 48. This headstock can further support an auxiliary carrier 122 (FIGS. 11, 12 and 14) which comprises a detector arm 124. The carrier 122 is also insertable into the cross-slide 58 and comprises a boss 126 which is similar to the boss 56 shown in FIG. 6 or 7 and can be installed in the socket 50 of the headstock 48. The carrier 122 further comprises a guide 128 provided with a dovetailed groove for a rail 130 which can be moved in parallelism with the bar 92 between an infinite number of positions. The rail 130 can be fixedly secured to the guide 128 in selected position and carries a pin 132 which is biased by a package of dished springs 134. The pin 132 carries a dial gauge 138 whose scanning portion constitutes the aforementioned arm 124. A screw 136 can move the pin 132 and gauge 138 against the opposition of springs 134.

Figure 17:
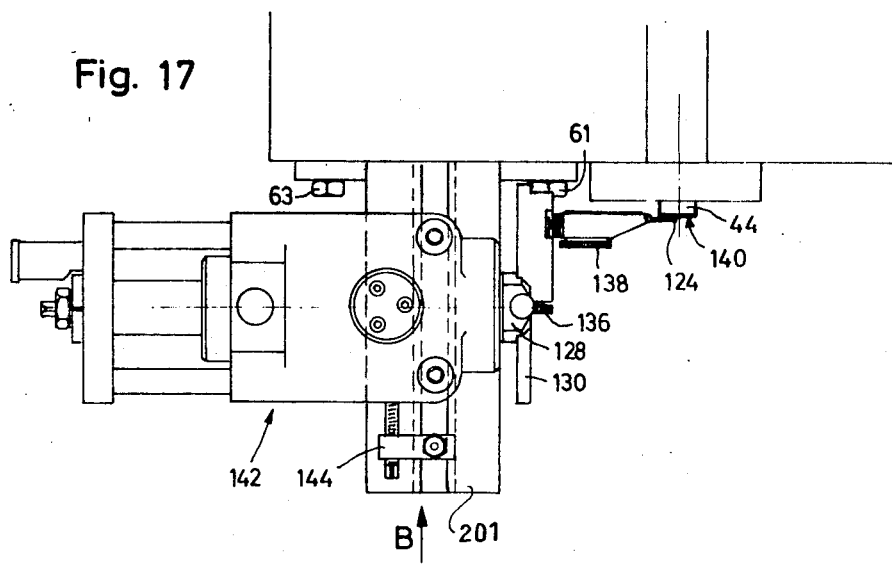
FIG. 17 is a top plan view of the structure shown in FIG. 16.
Figure 18:
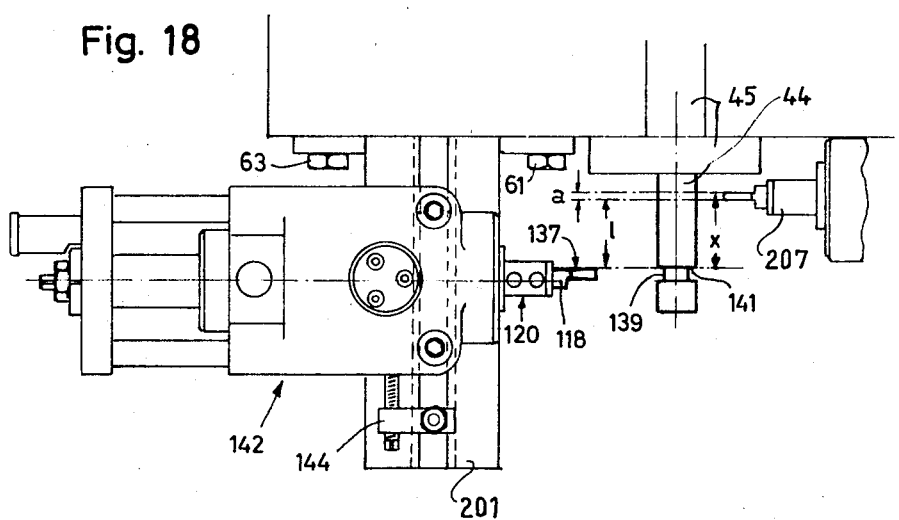
FIG. 18 is a similar top plan view but showing the cross-slide with the toolholder of FIG. 13 subsequent to formation of an annular groove at a predetermined axial distance from the front end face of the workpiece.

The operation of the positioning device 90 is as follows:

It is assumed that a workpiece 44 (e.g. a bar) is to be provided with a circumferential groove at a distance $x$ from its front end face 140 (FIGS. 16 to 18). Such treatment is to be carried out by a lateral cutting edge 137. The groove in the workpiece is shown at 139 in FIG. 18. One end of this groove is flanked by an annular shoulder 141 of the workpiece 44. In order to properly position the cross-slide 142 so that the tool 118 in this cross-slide will be able to form the groove 139 and shoulder 141, the end surface 102 of the flange 100 on the abutment 99 is moved against the lateral cutting edge 137 of the tool 118 in the holder 120 which is mounted in the socket 50 of the headstock 48 in a manner as shown in FIG. 13. The end surface 102 then represents the annular shoulder 141 on the treated workpiece 44 of FIG. 18. To this end, the bracket 94 for the bar 92 is moved into abutment with the stop 96 and the bar 92 is moved axially with reference to the bracket 94 until the end surface 102 abuts against the cutting edge 137. If the tool 118 were replaced by a tool with a right-hand cutting edge, the latter would have to be engaged by the end surface 104 of the flange 100. The adjustment of the bar 92 would be such that the end surface 104 would take the place of the end surface 102 shown in FIG. 13.

Figure 14:
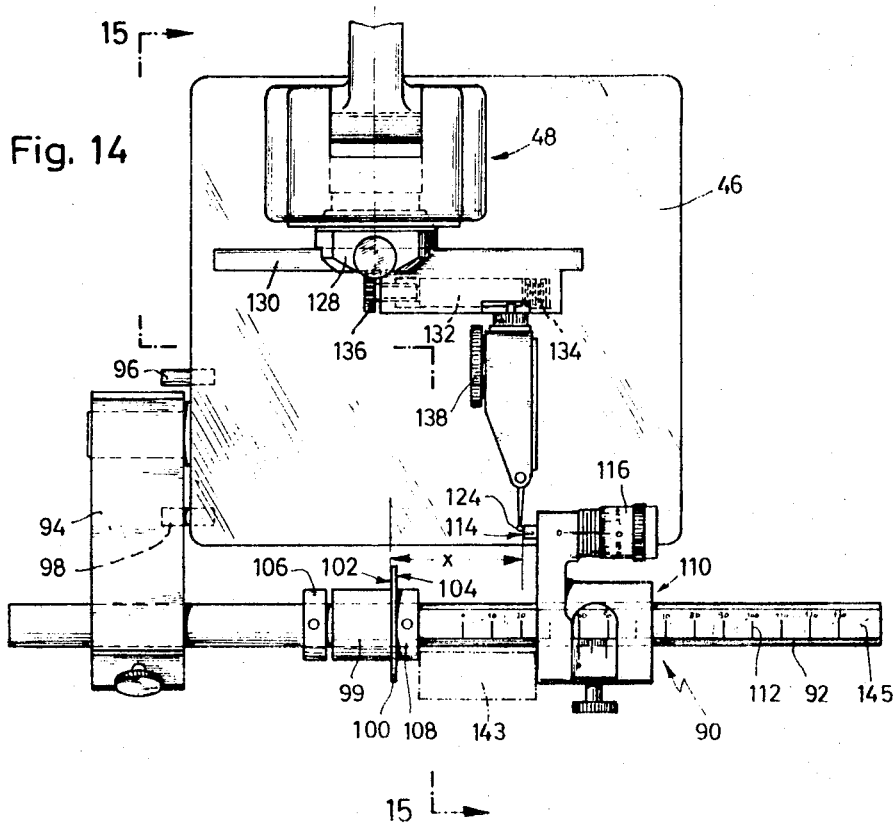
FIG. 14 is a similar top plan view of the apparatus but showing the auxiliary carrier of FIGS. 11 and 12 in the headstock.

Once the end surface 102 abuts against the cutting edge 137, the bar 92 is fixed to the bracket 94 by a screw 94a. The adjusting device 110 is thereupon moved along the bar 92 (i.e., with reference to the scale 112) until the reference surface 114 assumes a position at the desired distance $x$ from the end surface 102. Such position of the adjusting device 110 can also be determined by resorting to a customary end measure or end block 143 shown in FIG. 14 by phantom lines. This end block is placed between the ring 108 and the adjusting device 110 and rests on a flat 145 of the bar 92. In FIG. 14, the end block 143 is shown adjacent to rather than on the adjoining portion of the flat 145.

It is to be noted that the front end face 140 of the workpiece 44 shown in FIG. 16 has been formed in response to severing of a finished workpiece from the front end of a bar which constitutes the workpiece. Therefore, the distance $x$ must exceed a distance $l$ (length of the separated workpiece) by a distance $a$ (FIG. 13) which represents the thickness of the severing or cutoff tool 207 (FIG. 18) which separates the finished workpiece from the remainder of the bar. Thus, the distance $x$ is obtained by moving the reference surface 114 of the micrometer screw 116 away from the abutment 99 (by manipulating the micrometer screw 116) after the surface 114 is placed at the distance $l$ from the end surface 102 in response to movement of the adjusting device 110 along the bar 92.

Figure 15:
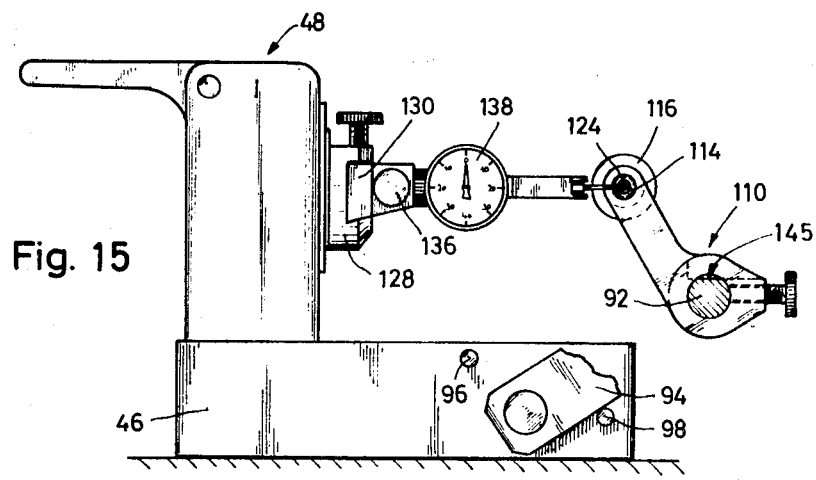
FIG. 15 is a partly elevational and partly sectional view of the positioning apparatus as seen in the direction of arrows from the line 15—15 of FIG. 14.

Once the reference surface 114 is positioned in a manner as shown in FIG. 13, the toolholder 120 is removed from the socket 50 of the headstock 48 and is replaced by the auxiliary carrier 122 in a manner as shown in FIG. 14. The operator thereupon manipulates the parts of the carrier 122 so as to move the arm 124 of the dial gauge 138 into abutment with the reference surface 114 (which is located at the distance $x$ from the end surface 102 of the flange 100). The arm 124 properly engages the reference surface 114 when the pointer of the dial gauge 138 registers with the zero graduation on the latter's dial (see FIG. 15).

The carrier 122 is then removed from the socket 50 of the headstock 48 and is inserted into the cross-slide 142 (FIG. 16) which is provided with a precise adjuster 144 (FIG. 17) capable of placing the cross-slide 142 in such position with reference to the carriage 201 that the arm 124 abuts against the end face 140 of the workpiece 44 in a manner as shown in FIG. 17. The adjuster 144 can move the cross-slide 142 in parallelism with the axis of the workpiece 44. The pointer of the dial gauge 138 again registers with the zero graduation of the dial when the arm 124 properly engages the front end face 140. The carrier 122 is then removed from the cross-slide 142 and is replaced by the toolholder 120 for the tool 118. The cutting edge 137 of this tool is then ready to form the workpiece 44 with the annular groove 139 and shoulder 141 as shown in FIG. 18. It will be seen that the workpiece 44 shown in FIG. 18 has been fed axially through a distance $x$ plus the distance between the shoulder 141 and front end face 140.

What is claimed as new and desired to be protected by Letters Patent is set forth in the appended claims:

1. A setting arrangement, comprising a support; a headstock mounted on said support and including holding means; a stand carried by said support; a setting member supported by said stand and having a cylindrical peripheral surface provided with at least one abutment; a toolholder including a cutting tool having a cutting edge, said toolholder being adapted to be mounted in the holding means of said headstock, said setting member being adjustable with reference to said stand and said stand being adjustable with reference to said support to place said setting member into an adjusting position in which the cutting edge of the tool in the holder mounted in said holding means engages said abutment; and a caliper including a carrier portion adapted to be mounted in the holding means of said headstock upon removal of said toolholder therefrom, a sensing portion mounted on said carrier portion and having two legs making an angle of less than 180°, said sensing portion being movable with reference to said carrier portion to an adjusted position in which said legs thereof engage the peripheral surface of said setting member in said adjusting position of the setting member, and means for holding said sensing portion in said adjusted portion with reference to said carrier portion.

2. A setting arrangement as defined in claim 1, wherein said support comprises a horizontal top surface and said stand includes a vertical upright movable along said top surface, said setting member being movable up and down along and being rotatable with reference to said upright about a horizontal axis, said stand further comprising means for fixing said setting member to said upright in such position of said setting member in which said abutment contacts the cutting edge of the tool of the toolholder which is mounted in the holding means of said headstock.

3. A setting arrangement as defined in claim 1, wherein said setting member comprises two radial abutments located in a common plane diametrically opposite each other with reference to the axis of said setting member and two peripheral notches, each of said notches being flanked by one of said abutments and by a facet making a right angle with the corresponding abutment, said facets extending to the opposite sides of the common plane of said abutments.

4. A setting arrangement as defined in claim 1, wherein said caliper further comprises supporting means supporting said sensing portion for axial movement with reference to said carrier portion.

5. A setting arrangement as defined in claim 4, wherein said carrier portion is a tube and said supporting means comprises a shank reciprocably received in said carrier portion and supporting said sensing portion.

6. A setting arrangement as defined in claim 4, wherein said caliper further comprises means for biasing said sensing portion axially of said carrier portion.

7. A setting arrangement as defined in claim 6, wherein said holding means comprises locking means for fixing said sensing portion in selected axial position with reference to said carrier portion.

8. A setting arrangement as defined in claim 1, wherein said sensing portion is movable with reference to said carrier portion in two directions at right angles to each other.

9. A setting arrangement as defined in claim 8, wherein said caliper further comprises a cheek supported by said carrier portion and supporting said sensing portion for movement in one of said directions, said cheek being movable with reference to said carrier portion in the other of said directions.

10. A setting arrangement as defined in claim 8, wherein the legs of said sensing portion remain in a predetermined plane during movement of said sensing portion in said directions.